(12) United States Patent
Toth et al.

(10) Patent No.: US 7,314,908 B2
(45) Date of Patent: Jan. 1, 2008

(54) POLYTHIOPHENE PROCESSES

(75) Inventors: Alan Edward John Toth, Burlington (CA); Tamara Perez-Cruz, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 147 days.

(21) Appl. No.: 11/281,514

(22) Filed: Nov. 18, 2005

(65) Prior Publication Data

US 2007/0117961 A1    May 24, 2007

(51) Int. Cl.
*C08F 6/00* (2006.01)

(52) U.S. Cl. .................... 528/480; 252/73; 252/77; 252/572; 264/291; 264/294; 425/335; 428/690

(58) Field of Classification Search ............ 252/73, 252/77, 572; 264/291, 294; 425/335; 428/690; 528/480

See application file for complete search history.

(56) References Cited

U.S. PATENT DOCUMENTS

| 4,740,436 | A | * | 4/1988 | Kobayashi et al. ......... 429/213 |
| 5,501,809 | A | * | 3/1996 | Schober et al. ............ 252/73 |
| 5,948,852 | A | * | 9/1999 | Wendt et al. ............. 524/731 |
| 6,621,099 | B2 | | 9/2003 | Ong et al. |
| 6,770,904 | B2 | | 8/2004 | Ong et al. |
| 6,897,284 | B2 | | 5/2005 | Liu et al. |
| 2003/0160234 | A1 | | 8/2003 | Ong et al. |

OTHER PUBLICATIONS

U.S. Appl. No. 11/085,215, filed Mar. 22, 2005, Toth et al.

Z. Bao et al., "Soluble and processable regioregular poly(3-hexylthiophene) for field-effect thin film transistor application with high mobility," *Appl. Phys. Lett.*, vol. 69, p. 4108 (1996).

R. D. McCullough, *Adv. Mater.*, vol. 10, p. 93 (1988).

K. Yoshino, S. Hayashi, R. Sugimoto, "Preparation and Properties of Conducting Heterocyclic Polymer Films by Chemical Method," *Jpn J. Appl. Phys.*, vol. 23, p. L899 (1984).

R. Sugimoto, S. Takeda, H. B. Gu, and K. Yoshino, "Preparation of soluble Polythiophene derivatives utilizing transition metal halides as catalysts and their property," *Chem. Express*, vol. 1, p. 635 (1986).

M. Leclerc, F. M. Diaz, G. Wegner, "Structural analysis of poly(3-alkylthiophene)s," *Makromol. Chem.*, vol. 190, p. 3105 (1989).

V. M. Niemi, P. Knuuttila, J. -E. Osterholm, and J. Korvola, "Polymerization of 3-Alkylthiophens with $FeCl_3$," *Polymer*, vol. 33, p. 1559 (1992).

J. Kowalik, L. M. Tolbert, S. Narayan, and A. S. Abhiraman, "Electrically Conducting Poly(undecylbithiophene)s. 1. Regioselective Synthesis and Primary Structure," *Macromolecules*, vol. 34, p. 5471 (2001).

\* cited by examiner

*Primary Examiner*—Terressa Boykin
(74) *Attorney, Agent, or Firm*—Oliff & Berridge, PLC

(57) ABSTRACT

Polythiophene may be processed using a method including providing a composition including the polythiophene and a liquid including at least one hydrocarbon having at least 6 carbon atoms; heating the composition to a temperature of at least about 50° C.; and separating solid polythiophene from the heated composition. Alternatively, the method may include providing a composition including polythiophene and an organic liquid; heating the composition to dissolve a portion of the polythiophene in the organic liquid; and separating solid polythiophene from the heated composition.

17 Claims, No Drawings

POLYTHIOPHENE PROCESSES

TECHNICAL FIELD

This disclosure relates to polythiophene processes, for example, to methods for modifying the characteristics of a polythiophene, such as its mobility.

RELATED APPLICATION

U.S. application Ser. No. 11/085,215 describes a method for removing impurities from polythiophene. The method comprises: (a) mixing a composition comprising the polythiophene, water and an organic liquid at a temperature at which the organic liquid dissolves the polythiophene; (b) allowing an aqueous phase to separate from an organic phase and recovering organic phase; (c) adding water to recovered organic phase and mixing the resulting composition at a temperature at which the organic liquid dissolves the polythiophene; (d) allowing an aqueous phase to separate from an organic phase and recovering organic phase; and (e) allowing polythiophene solid to precipitate from recovered organic phase.

The appropriate components and process aspects of the foregoing may be selected for the present disclosure in embodiments thereof, and the entire disclosure of the above-mentioned application is totally incorporated herein by reference.

REFERENCES

U.S. Pat. Nos. 6,897,284, 6,770,904 and 6,621,099 and U.S. Patent Publication No. 2003/0160234 A1 each describe an electronic device containing a polythiophene. In preparing the polythiophene, U.S. Pat. No. 6,897,284 discloses subjecting the polythiophene to soxhlet extraction with appropriate solvents such as methanol, hexane, heptane, toluene, xylene, tetrahydrofuran, chlorobenzene, and the like. The polythiophene thus obtained can be further purified by precipitation from a suitable nonsolvent such as methanol or acetone. U.S. Pat. No. 6,770,904 and U.S. Patent Publication No. 2003/0160234 A1 also describe subjecting the polythiophene to soxhlet extraction with appropriate solvents. The entire disclosure of these patent documents is totally incorporated herein by reference.

BACKGROUND

A number of polythiophenes are known that may be useful as conductive or semiconductor materials in electronic devices such as thin film transistors, photovoltaic cells, organic/polymer light emitting diodes, and the like. Particularly useful polythiophenes are those that are soluble in organic solvents, and can thus be processed into microelectronic components by solution processes, such as spin coating, solution casting, dip coating, screen printing, stamp printing, jet printing and the like, thereby lowering the manufacturing cost of microelectronic devices. Specifically, certain polythiophenes, which contain repeating 2,5-thienylene (also known as 2,5-thiophendiyl) units possessing long side-chains, such as alkyl, arranged in a regioregular manner on the polythiophene backbone, may be suitable for these applications. The long alkyl side-chains, while imparting enhanced solubility characteristics to the polythiophenes, may also help induce and facilitate molecular self-organization when they are positioned in a regioregular manner on the polymer backbones.

In a condensed phase, such as in thin films, molecular self-organization of polymer molecules under appropriate conditions permits ordered microstructure domains, and which molecules when present in the charge transport layers of microelectronic devices could enhance their electrical performance. For example, for the polythiophene semiconductor channel layers in thin film transistors, the presence of the lamellar π-stacking microstructures has been known to lead to superior field-effect transistor properties.

Thin film transistors, which utilize solution processable organic/polymer materials and polymer composites, may also be fabricated on plastic substrates to permit lightweight structurally flexible integrated circuits that may be mechanically more robust and durable. These flexible lightweight integrated circuits are useful for incorporation into electronic devices, such as large-area image sensors, electronic paper and other display media where lightweight characteristics and device structural flexibility may be very appealing. These integrated circuit elements may also find use in low-end microelectronics, such as smart cards, radio frequency identification (RFID) tags, and memory/storage devices that require mechanical durability for extended life. For these applications, the performance of the polymer semiconductor materials, such as the polythiophenes in the channel layer, is of value. Also, while different synthetic methodologies and reaction conditions may provide analytically similar polythiophenes, the electrical performance of these polythiophenes, particularly their field-effect transistor characteristics when used as semiconductor channel materials in thin film transistor devices, may be dissimilar, for example there may be variations in the field-effect.

Certain polythiophenes have been reported for use as semiconductor materials in thin film field-effect transistors. One known example is a regioregular poly(3-alkylthiophene), see for example reference Z. Bao et al., "Soluble and processable regioregular poly(3-hexylthiophene) for field-effect thin film transistor application with high mobility," *Appl. Phys. Lett.*, Vol. 69, p4108 (1996), which is herein incorporated in its entirety by reference. The use of polymer semiconductors, such as polythiophenes, as the semiconductor channel layers has enabled the fabrication of flexible transistors on plastic substrates.

Polythiophenes can be prepared by many synthetic procedures depending specifically on the nature of the desired polythiophenes structures. A review of the chemistry and synthesis of polythiophenes was published by Richard D. McCullough, see reference R. D. McCullough, *Adv. Mater.*, Vol. 10, p. 93 (1988), which is herein incorporated in its entirety by reference. Of all the preparative procedures for soluble polythiophenes, such as poly(alkylthiophenes), one synthetic methodology is metal halide-mediated oxidative coupling polymerization, reported by R. Sugimoto, see K. Yoshino, S. Hayashi, R. Sugimoto, "Preparation and Properties of Conducting Heterocyclic Polymer Films by Chemical Method," *Jpn J. Appl. Phys.*, Vol. 23, p. L899 (1984), and R. Sugimoto, S. Takeda, H. B. Gu, and K. Yoshino, "Preparation of soluble Polythiophene derivatives utilizing transition metal halides as catalysts and their property," *Chem. Express*, Vol. 1, p. 635 (1986), each of which are herein incorporated in their entirety by reference. In this method, alkylthiophene is usually treated with ferric chloride ($FeCl_3$) in chloroform under a blanket of dry air, or with a slow stream of dry air or inert gas bubbling through the reaction medium to drive off the generated HCl for a period of from a few hours to days. A detailed study of this polymerization was also reported by Leclerc, see reference M. Leclerc, F. M. Diaz, G. Wegner, "Structural analysis of poly(3-alkylthiophene)s," *Makromol. Chem.*, Vol. 190, p. 3105 (1989), which is herein incorporated in its entirety by reference.

Polythiophenes prepared with chloroform and other reaction media, such as for example, toluene, carbon tetrachloride, pentane, hexane, and the like, are illustrated in, for example, V. M. Niemi, P. Knuuttila, J.-E. Osterholm, and J. Korvola, "Polymerization of 3-Alkylthiophens with $FeCl_3$," *Polymer*, Vol. 33, p. 1559 (1992) and J. Kowalik, L. M. Tolbert, S. Narayan, and A. S. Abhiraman, "Electrically Conducting Poly(undecylbithiophene)s. 1. Regioselective Synthesis and Primary Structure," *Macromolecules*, Vol. 34, p. 5471 (2001), which are herein incorporated in their entirety by reference.

After the formation of a polythiophene, it may undergo soxhlet extraction. Soxhlet extraction is a time-consuming process that may take a week or more. In addition, it does not always result in polymer with sufficient mobility. Furthermore, it cannot easily be conducted on a large scale. Thus, a method for treating polythiophene that is shorter, more effective and can be conducted on larger scales is desired.

SUMMARY

In embodiments, the present disclosure is directed to a method comprising: (a) providing a composition comprising polythiophene and a liquid comprising at least one hydrocarbon having at least 6 carbon atoms; (b) heating the composition to a temperature of at least about 50° C.; and (c) separating solid polythiophene from the heated composition.

In embodiments, the present disclosure is directed to a method comprising: (a) providing a composition comprising polythiophene and an organic liquid; (b) heating the composition to dissolve a portion of the polythiophene in the organic liquid; and (c) separating solid polythiophene from the heated composition.

The term "polythiophene" refers, for example, to a polymer containing thiophene monomers. Thiophene monomers include thiophene itself and substituted thiophene, such as an alkyl substituted thiophene. In embodiments, the substituted thiophenes are substituted with an alkyl or substituted alkyl, such as an alkyl or substituted alkyl having from 1 to about 25 carbon atoms, such as from about 5 to about 18 carbon atoms.

EMBODIMENTS

In embodiments, the present disclosure is directed to method in which a polythiophene is combined with a liquid, specifically an organic liquid. This liquid may comprise one or more hydrocarbons having at least 6 carbon atoms. In embodiments, the liquid comprises one or more alkanes (including cycloalkanes) having 6 to about 20 or to about 10 or to about 8 carbon atoms. In embodiments, the liquid comprises one or more alkanes (including cycloalkanes) having 6 to 8 carbon atoms. In embodiments, the liquid comprises one or more alkanes (including cycloalkanes) having about or exactly 7 carbon atoms, such as n-heptane, 2-methylhexane, 3-methylhexane, cycloheptane, methylcyclohexane and mixtures thereof.

In embodiments, the liquid is a hydrocarbon mixture separated from crude oils into a solvent having a specific boiling point range. These mixtures may be natural products of variable composition depending on the crude oil from which they have been fractionated but having a given boiling point range. For example, the mixture may be a mixture of n-heptane with one or more other hydrocarbons containing about or exactly 7 carbon atoms.

In embodiments, the liquid has a boiling point of from about 60° C. to about 125° C., such as from about 85° C. to about 120° C.

In the method, solid polythiophene is recovered from the liquid, such as by filtration. Thus, the liquid must not completely dissolve the polythiophene at least at certain temperatures. However, in embodiments, the liquid dissolves thiophene oligomers and/or smaller thiophene polymers at least as the temperature of the liquid is increased to, for example, 50° C., such that any residual monomer, the thiophene oligomers and/or smaller thiophene polymers are removed during the method. In this way, the molecular weight distribution of the resulting polythiophene is narrowed, which may lead to an increase in the mobility of the resulting polythiophene.

In embodiments, the composition comprising polythiophene and liquid is heated to a temperature of at least about 50° C., in embodiments to a temperature from about 60° C. or about 70° C. or about 80° C. to about the boiling point of the liquid. In embodiments, the composition is heated to a temperature of from about 70° C. to about 95° C. In embodiments, the composition is heated to a temperature at which a portion, but not all, of the polythiophene is dissolved in the liquid.

The amount of polythiophene dissolved by the liquid depends on factors, such as the liquid used, the temperature to which it is heated and/or the characteristics of the polythiophene, such as the amount of lower molecular weight polythiophene present. In embodiments, the portion of the polythiophene that is dissolved is from about 1 wt. % to about 15 wt. % of the polythiophene, such as from about 3 wt. % to about 10 wt. % of the polythiophene.

The composition may be maintained at the elevated temperature, such as for at least a minute, before the solid polythiophene is separated from the composition. In embodiments, the composition is maintained at this elevated temperature for about an hour or longer before the solid polythiophene is separated from the composition.

The solid polythiophene may be separated from the heated composition, such as by filtration, at a temperature of at least about 50° C., in embodiments at a temperature of from about 60° C. or about 70° C. or about 80° C. to about the boiling point of the liquid. In embodiments, the solid polythiophene is separated from the composition at a temperature of from about 70° C. to about 95° C. In embodiments, the solid polythiophene is recovered from the composition at a temperature at which a portion, but not all, of the polythiophene is dissolved in the liquid.

The solid polythiophene recovered from the composition may be subjected to a method described herein one or more additional times. In particular, the recovered polythiophene may be subjected to this method 1, 2, 3, 4, 5 or more times.

After conducting the method described herein one or more times, the solid polythiophene may be washed with a non-solvent, for example, an alcohol, such as methanol, by, for example, adding the solid polythiophene to methanol and filtering the resulting composition to recover the solid polythiophene. The recovered solid polythiophene may then be dried in a vacuum oven, at, for example, room temperature (about 20° C. to about 25° C.) for 24 hours. By this technique, residual amounts of the liquid used in the method described herein, if present, can be removed from the polythiophene.

In embodiments, this method increases the mobility of the polythiophene. Mobility is the speed of charge carrier under a unit electric field. Therefore, a higher mobility polymer semi-conductor makes for a faster transistor with a potentially greater on/off ratio. Mobility is measured by fabricating a multilayer OTFT (organic thin film transistor) device. Every layer is controlled to provide an accurate mobility for the semiconductor. Then the I-V curves of many transistors are measured. Finally, the mobility value is extracted from the I-V curves using the following equation:

$$I_{SD}=C_i\mu(W/2L)(V_G-V_T)^2.$$

In embodiments of the present disclosure, an average mobility of at least about 0.08 cm$^2$/V.s., such as an average mobility of from about 0.08 cm$^2$/V.s to about 0.1 cm$^2$/V.s, is achieved.

The polythiophenes that undergo the method described herein may be any polythiophene. In particular, the polythiophene may be a substituted polythiophene. In particular, the polythiophene may be substituted at the three or four positions of at least one of the thiophene monomers that make up the polymer.

Specifically, polythiophenes, which may be useful in microelectronic applications, contain one or a combination of repeating units selected from the group consisting of 2,5-thienylene (or 2,5-thiophenediyl) (I), 2,5-thienylene (or 2,5-thiophenediyl) (II), and a divalent linkage, D

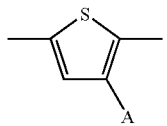

(I)

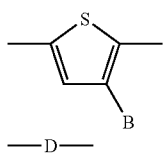

(II)

wherein, for example, A is a long side-chain comprising, for example, alkyl, alkyl derivatives, alkoxy, and the like, such as alkoxyalkyl, siloxyalkyl, perhaloalkyl, polyether, and the like; B is hydrogen atom or a substituent, such as for example, methyl, ethyl, methoxy, ethoxy, bromo, and the like; and D is selected, for example, from the group consisting of arylene with, for example, from about 6 to about 36 carbon atoms, such as phenylene, biphenylene, phenanthrenylene, dihydrophenanthrenylene, fluorenylene, oligoarylene, methylene, polymethylene, dialkylmethylene, dioxyalkylene, dioxyarylene, oligoethylene oxide, and the like.

The long side-chain, A, may be one that contains, for example, from about 5 to about 25 atoms, and the small substituent, B, contains from 1 to about 3 carbon atoms. Illustrative examples of A of the 2,5-thienylene moiety (I) include alkyl with, for example, from about 1 to about 25 carbon atoms, and more specifically, from about 5 to about 18 carbon atoms, such as pentyl, hexyl, heptyl, octyl, nonyl, decyl, undecyl, dodecyl, hexadecyl, octadecyl, isomeric forms thereof, mixtures thereof, and the like; alkoxy and alkoxyalkyl with, for example, from about 5 to about 25 carbon atoms, such as for example pentyloxy, hexyloxy, heptyloxy, ocytyloxy, methoxybutyl, methoxybutoxy, methoxyhexyl, methoxyheptyl, and the like; and polyether chains, such as polyethylene oxide; perhaloalkyl, such as perfluoroalkyl, and the like.

More specifically, in embodiments of the present disclosure, the polythiophenes, which can be obtained from the monomer segment of Formula (III)

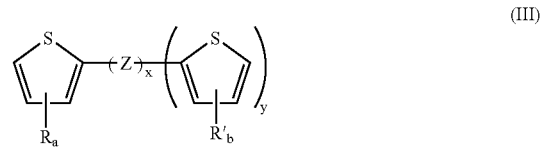

(III)

wherein R is alkyl, alkoxy, or derivatives thereof of, for example, from about 1, and more specifically, about 5 to about 25 carbon atoms; R' is hydrogen, halogen, alkyl, alkoxy, or the derivatives thereof, for example, from about 1 to about 25 carbon atoms in length; a and b represent the number of substituents, and for example, are independently 1 or 2; Z is a divalent conjugated linkage that may also contain substituted and/or nonsubstituted 2,5-thienylene (or 2,5-thiophenediyl) moieties, and other aromatic units such as arylene, furandiyl, pyrrolediyl, pyridinediyl, benzofurandiyl, dibenzofurandiyl, benzothiophenediyl, dibenzothiophenediyl, carbazolediyl, and the like; and x and y represent the number of segments, such as for example, a number of from 0 to about 3.

The number average molecular weight ($M_n$) of the polythiophenes can be, for example, from about 2,000 to about 100,000, and more specifically, from about 4,000 to about 50,000, and the weight average molecular weight ($M_w$) thereof can be from about 4,000 to about 500,000, and more specifically, from about 5,000 to about 100,000 both as measured by gel permeation chromatography using polystyrene standards.

The polythiophene may be selected from the group consisting of Formulas (1) to (21) set forth below. In these formulas, n represents the number of segments and may be from about 10 to about 1,000.

(1)

(2)

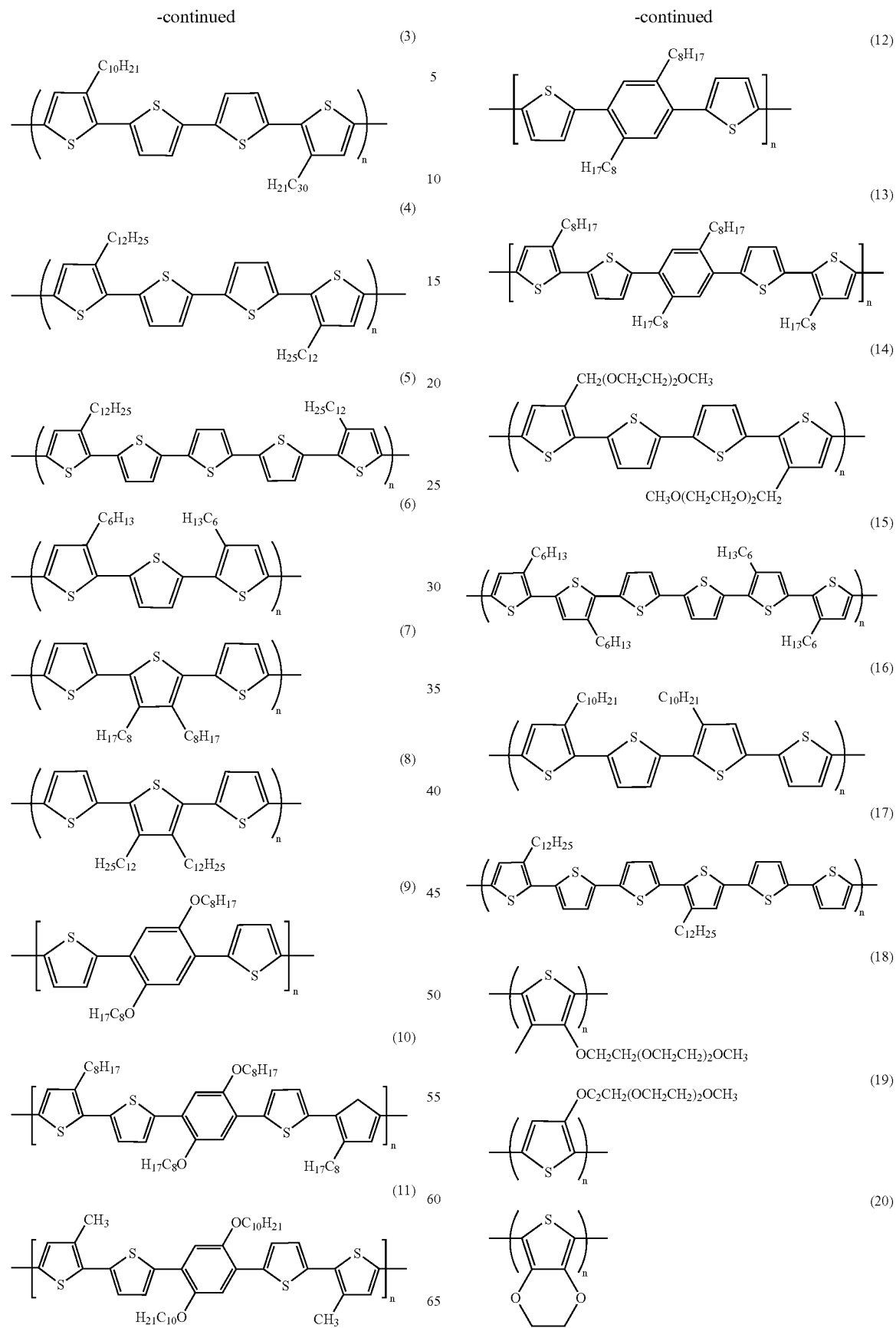

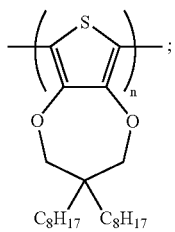

(21)

In a particular embodiment, the polythiophene has formula (4).

The polythiophene may be synthesized by any method. In embodiments, the polythiophene is synthesized by polymerizing polythiophene monomers and/or oligomers thereof in an organic solvent in the presence of metal halide, such as ferric chloride. In embodiments, the organic solvent is chlorobenzene. However, the present disclosure is not limited to polythiophenes formed in the presence of $FeCl_3$ or another metal halide. Methods for forming polythiophene are further described in U.S. Pat. No. 6,897,284, which is herein incorporated by reference in its entirety.

After forming the polythiophene, the polythiophene may be subjected to a purification technique, such as the one described in U.S. Pat. No. 6,897,284, which is herein incorporated by reference in its entirety, before it is subjected to the method described herein. In particular, the polythiophene can be washed sequentially with water and a dilute aqueous ammonium hydroxide solution, followed by washing with water, and then isolating the polythiophene product through precipitation by pouring the dilute solution into an appropriate nonsolvent such as methanol or acetone.

Alternatively, or in addition, the polythiophene can be subjected to the purification technique described in U.S. application Ser. No. 11/085,215, which is herein incorporated by reference in its entirety. In particular, the polythiophene can be subjected to a method comprising: (a) mixing a composition comprising polythiophene, water and an organic liquid at a temperature at which the organic liquid dissolves the polythiophene; (b) allowing an aqueous phase to separate from an organic phase and recovering the organic phase; (c) adding water to recovered organic phase and mixing the resulting composition at a temperature at which the organic liquid dissolves the polythiophene; (d) allowing an aqueous phase to separate from an organic phase and recovering the organic phase; (e) repeating steps (c) and (d) at least one time; (f) adding a basic aqueous solution to organic phase recovered in (e) and mixing the resulting composition at a temperature at which the organic liquid dissolves the polythiophene; (g) allowing an aqueous phase to separate from an organic phase and recovering the organic phase; (h) using the organic phase recovered in step (g), repeating steps (c) and (d) at least one time; and (i) allowing polythiophene solid to precipitate from organic phase recovered in (h).

Formation of a Di-Alkyl Quaternary Thiophene

In an embodiment, the polythiophene is a polymer of a quaternary thiophene having the following formula:

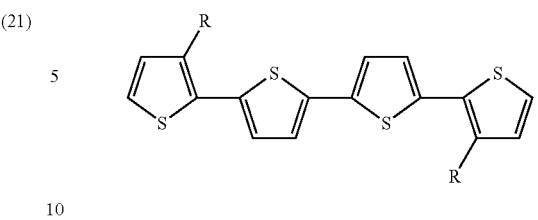

where R is a side-chain comprising, for example, alkyl, alkyl derivatives, alkoxy, and the like, such as alkoxalkyl, siloxalkly, perhaloalkyl, polyether, and the like. Each side-chain R, which may be the same or different, may be one that contains, for example, from about 5 to about 25 carbon atoms, such as an alkyl having from 5 to 18 carbon atoms.

These quaternary thiophenes can be made by the following reaction scheme:

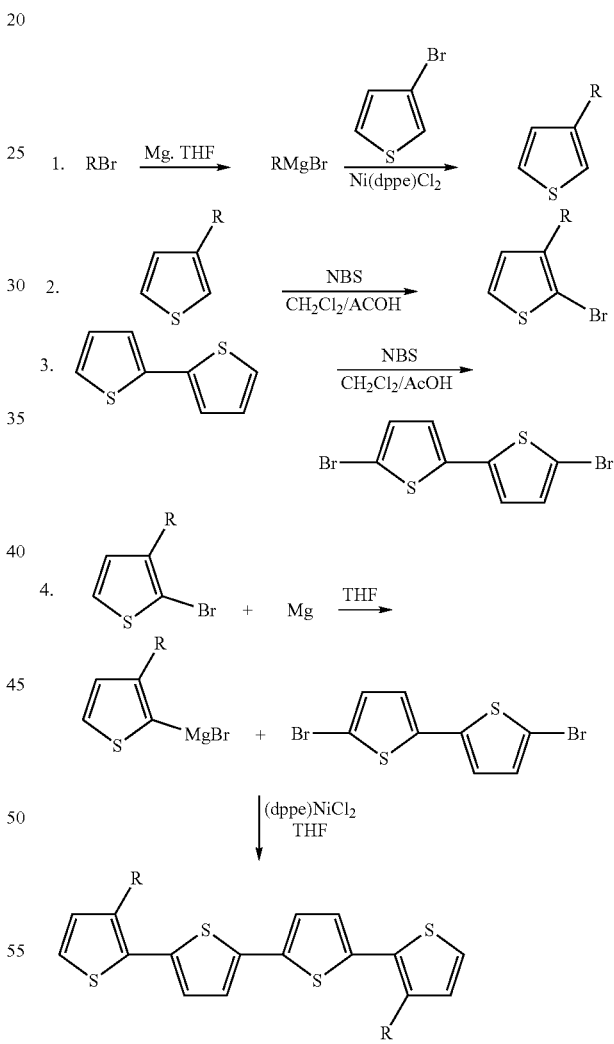

EXAMPLES

The following examples illustrate specific embodiments of the present disclosure. The appropriate reagents, component ratio/concentrations may be adjusted as necessary to achieve specific product characteristics. All parts and percentages are by weight unless otherwise indicated.

The polythiophene formed in each of the following examples is

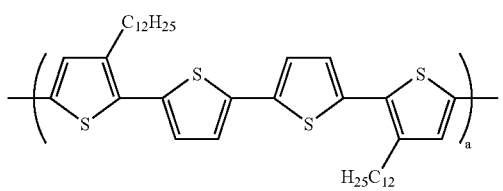
(4)

Thus, a starting material for the polymerization is the quaternary thiophene having the following formula:

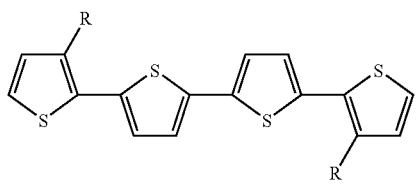

where R is $C_{12}H_{25}$.

The crude polythiophene was formed by one of two methods. To form Crude Samples 1, 2, 3, and 6 below, the crude polythiophene was formed at the 5 g scale by 48 hour synthesis using ferric chloride and chlorobenzene, followed by 3 to 4 room temperature (about 20° C. to about 25° C.) dichloromethane/deionized water (DIW) liquid/liquid extractions, and a room temperature aqueous $NH_4OH$ wash followed by 3 more room temperature dichloromethane/DIW washes.

All of the other Crude Samples were prepared at different scales, of 5-100 g, using the polymer dissolution work-up described in U.S. application Ser. No. 11/085,215, which is herein incorporated by reference in its entirety. In particular, after synthesis of the polythiophene using ferric chloride and chlorobenzene, the polythiophene was dissolved in chlorobenzene at 58° C. for 7-8 DIW washes, followed by a weak aqueous $NH_4OH$ wash, then DIW washes to a pH of less than 7 and conductivity of less than 5 μS, each of the washes being conducted at 58° C.

Comparative Examples 1-8

A portion of each of Crude Samples 1-8 (Comparative Examples 1-8, respectively) was subjected to Soxhlet extraction as follows:

1. Charged 1 g of crude polymer to a 43×123 mm extraction thimble and charged to an appropriately sized Soxhlet extraction apparatus. Attached condenser and nitrogen inlet and outlet. Started nitrogen blanket. (In the case of Comparative Example 4, 5 g of Crude Sample 4 was used and the method was adjusted accordingly.)

2. To a 1 L flat bottom extraction flask, charged about 800 ml of Methanol and heated to gentle reflux by hot plate.

3. Allowed extraction to proceed for 24 hours.

4. After 24 hours, carefully drained the thimble and dried in a vacuum oven to remove all traces of methanol.

5. After drying, recharged to the Soxhlet extractor and extracted with 800 ml of Heptane, as purchased from Caledon Laboratories (CAS 142-82-5, $CH_3(CH_2)_5CH_3$, having a boiling point of 98° C.).

6. After 48 hours, removed and dried the thimble to remove Heptane.

7. After drying, recharged to the Soxhlet extractor and extracted with 800 ml of Chlorobenzene. This will extract all the soluble portion of the polymer to the flask.

8. After 48 hours of reflux, turned off the heat and let it cool to room temperature, added 100 ml of methanol, and left without stirring overnight to settle.

9. The next day, filtered in a 5.5 cm buchner funnel with 1.5 μ glass fiber filter paper, and rinsed 3 times on the funnel with 100 ml increments of settle.

10. Placed in a room temperature vacuum oven overnight, weighed and calculated the yield (final dry weight after purification divided by starting weight×100). A typically yield is 85-90%.

By this technique, polymers having the following characteristics were obtained:

TABLE 1

| Comparative Example | Polymer | Scale (g) | DSC onset (° C.) | Mobility ($cm^2/V.s.$) |
|---|---|---|---|---|
| 1 | Crude Sample 1 | 5 | 136.5 | 0.056-0.062 |
|   | Soxhlet Extracted | 1 | 139.0 | 0.068-0.075 |
| 2 | Crude Sample 2 | 5 | 138.2 | 0.068-0.077 |
|   | Soxhlet Extracted | 1 | 139.8 | 0.062-0.081 |
| 3 | Crude Sample 3 | 5 | 133.6 | 0.06-0.065 |
|   | Soxhlet Extracted | 1 | 135.9 | 0.042-0.051 |
| 4 | Crude Sample 4 | 20 | 138.4 | 0.075-0.1 |
|   | Soxhlet Extracted | 5 | 139.5 | 0.075-0.1 |
| 5 | Crude Sample 5 | 20 | 136.6 | 0.047-0.068 |
|   | Soxhlet Extracted | 1 | 137.2 | 0.05-0.062 |
| 6 | Crude Sample 6 | 5 | 140.4 | 0.04-0.06 |
|   | Soxhlet Extracted | 1 | 142.1 | 0.046-0.059 |
| 7 | Crude Sample 7 | 20 | 141.0 | 0.085-0.09 |
|   | Soxhlet Extracted | 1 | 140.3 | 0.064-0.077 |
| 8 | Crude Sample 8 | 5 | 140.4 | 0.085-0.096 |
|   | Soxhlet Extracted | 1 | 136.1 | 0.046-0.07 |

In Table 1, the results of the treatment of 8 crude samples by Soxhlet extraction is demonstrated. Only in Comparative Example 1 was a crude polymer having an average mobility of less than 0.08 $cm^2/V.s.$ improved by Soxhlet extraction. However, the improvement did not result in polymer having an average mobility of at least 0.08 $cm^2/V.s.$ In Comparative Examples 3, 5, and 6, Soxhlet extraction either did nothing to improve the mobility (Comparative Examples 5 and 6) or made the mobility worse (Comparative Example 3).

In Comparative Examples 4, 7, and 8, the crude polymer was formed by the process described in U.S. application Ser. No. 11/085,215. As a result, the mobility of these crude polymers were near or above 0.08 $cm^2/V.s.$ However, Soxhlet extraction either did not improve mobility (Comparative Example 4) or made the mobility worse (Comparative Examples 7 and 8).

Examples 1-9

A portion of each of Crude Samples 1, 2, and 6-12 (Examples 1-9, respectively) was subjected to the method described below, which is hereinafter referred to as a hot heptane method. In Examples 4 and 6, a second independent run of the hot heptane method was conducted to show reproducibility. The hot heptane method conducted is as follows:

1. Charged 1 g of crude polymer (powder) to a 250 ml reactor flask equipped with a condenser, thermometer and magnetic stir bar, under nitrogen. (In the second run of Example 4, 5 g of Crude Sample 7 was used and the method was adjusted accordingly.)

2. Added 150 ml of Heptane and heated at 95° C. using a heating mantel.

3. Maintained the temperature at about 95° C. in the reactor for 1 hour.

4. Filtered the polymer through 5.5 cm Buchner funnel with 1.5 µ glass fiber filter media. Kept the temperature as close to 85° C. as possible, during the filtration, by using a jacketed Buchner funnel (Bath set point=90° C.). The color of the filtrate should be orange-red.

5. Charged the solid polymer, already filtered, to the reactor again. Repeated steps 2, 3 and 4 two more times.

6. Transferred the polymer cake to a 200 ml beaker and washed at room temperature, with methanol (75 ml), using a magnetic stir bar. Left the resulting product for at least 30 minutes and filtered again.

7. Rinsed the cake on the funnel with 3×75 ml methanol increments.

8. Dried the polymer in the vacuum oven, at room temperature, for 24 hours. A typical yield is 88%.

By this technique, polymers having the following characteristics were obtained:

TABLE 2

| Example | Polymer | Scale (g) | DSC onset (° C.) | Mobility (cm$^2$/V.s.) |
|---|---|---|---|---|
| 1 | Crude Sample 1 | 5 | 136.5 | 0.056-0.062 |
|   | Hot Heptane Treated | 1 | 137.7 | 0.09-0.14 |
| 2 | Crude Sample 2 | 5 | 138.2 | 0.068-0.077 |
|   | Hot Heptane Treated | 1 | 139.2 | 0.08-0.12 |
| 3 | Crude Sample 6 | 5 | 140.4 | 0.04-0.06 |
|   | Hot Heptane Treated | 1 | 142.2 | 0.087-0.12 |
| 4 | Crude Sample 7 | 20 | 141.0 | 0.085-0.09 |
|   | Hot Heptane Treated | 1 | 140.3 | 0.1-0.12 |
|   | Hot Heptane Treated | 5 | 140.2 | 0.08-0.12 |
| 5 | Crude Sample 8 | 5 | 140.4 | 0.085-0.096 |
|   | Hot Heptane Treated | 1 | 141.7 | 0.1-0.17 |
| 6 | Crude Sample 9 | 5 | 140.1 | 0.053-0.08 |
|   | Hot Heptane Treated | 1 | 140.8 | 0.09-0.12 |
|   | Hot Heptane Treated | 1 | 140.3 | 0.1-0.12 |
| 7 | Crude Sample 10 | 100 | 139.9 | 0.07-0.1 |
|   | Hot Heptane Treated | 1 | 140.7 | 0.06-0.1 |
| 8 | Crude Sample 11 | 100 | 139.6 | 0.078-0.081 |
|   | Hot Heptane Treated | 1 | 140.0 | 0.07-0.09 |
| 9 | Crude Sample 12 | 5 | 139.3 | 0.08-0.09 |
|   | Hot Heptane Treated | 1 | 139.8 | 0.08-0.09 |

In Table 2, the results of the treatment of 9 crude samples by the hot heptane method is demonstrated. Four of the crudes (Examples 1, 2, 3 and 6) had an average mobility of less than 0.08 cm$^2$/V.s. However, after conducting the hot heptane method, the polymers had an average mobility of greater than 0.08 cm$^2$/V.s.

The other five crudes that were subjected to the hot heptane method were crudes having a mobility near or above 0.08 cm$^2$ V.s. Of these, two showed significant improvement in mobility after the hot heptane method and three were neither better nor worse after purification.

Unlike Soxhlet extraction, no crude polymer was significantly worse after conducting the hot heptane method.

Reproducibility was demonstrated (in Examples 4 and 6) where the same crude polymer was purified on two separate occasions at the same or at different scales.

To treat 1 g of polymer by Soxhlet extraction requires about 2.7 L of solvents and about 6-8 days of processing. A scale-up to, for example, 100 g, would require a 25 gallon Soxhlet extractor, about 240 L of solvents and about 8-10 days processing time on a 24 hour 3 shift basis. Manufacturing scale to 1 Kg would require even larger amounts of solvent and even bigger Soxhlet extraction equipment.

In contrast, 1 g of the crude polymer can be treated by the method described herein using about 50 to about 150 ml of Heptane in a one day 1 shift process. Scaling up to 1 Kg may require 3 washes using 26 USG of Heptane each in a 30 USG reactor. For filtration, a standard 1 µ bag filter could be used. As a result, in addition to obtaining better results, there is far less expense associated with scaling up the method described herein, as compared to Soxhlet extraction.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of modifying mobility of a polythiophene, the method comprising:
    (a) providing a composition comprising polythiophene and a liquid comprising at least one hydrocarbon having at least 6 carbon atoms;
    (b) heating the composition to a temperature of at least about 50° C., wherein about 1 wt. % to about 15 wt. % of said polythiophene is dissolved in the liquid; and
    (c) separating solid polythiophene from the heated composition;
    wherein the molecular weight distribution of said polythiophene is narrowed.

2. The method according to claim 1, further comprising repeating (a) to (c) one or more times using the solid polythiophene separated in (c).

3. The method according to claim 1, wherein said liquid comprises at least one alkane or cycloalkane with from 6 to about 20 carbon atoms.

4. The method according to claim 3, wherein said liquid comprises at least one alkane or cycloalkane with from 6 to about 8 carbon atoms.

5. The method according to claim 4, wherein said liquid comprises at least one alkane or cycloalkane with about 7 carbon atoms.

6. The method according to claim 5, wherein said liquid comprises at least one hydrocarbon selected from the group consisting of n-heptane, 2-methylhexane, 3-methylhexane, cycloheptane and methylcyclohexane.

7. The method according to claim 1, wherein, in (b), said composition is heated to a temperature of from about 60° C. to about the boiling point of the liquid.

8. The method according to claim 1, wherein said liquid has a boiling point of from about 60° C. to about 125° C.

9. The method according to claim 1, wherein said polythiophene contains the following repeating unit:

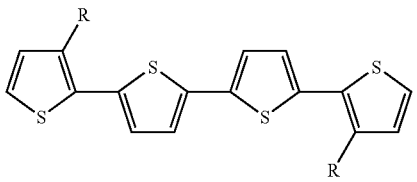

where each R, which may be the same or different, is an alkyl or substituted alkyl.

10. A method according to claim 9, wherein said polythiophene is

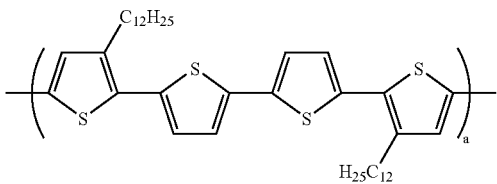

11. The method according claim 1, wherein said method increases the average mobility of the polythiophene to at least about 0.08 cm$^2$/V.s.

12. A method of modifying mobility of a polythiophene, the method comprising:
(a) providing a composition comprising polythiophene and an organic liquid;
(b) heating the composition to dissolve a portion of said polythiophene in said organic liquid; and
(c) separating solid polythiophene from the heated composition;
wherein the molecular weight distribution of said polythiophene is narrowed.

13. The method according to claim 12, further comprising repeating (a) to (c) one or more times using the solid polythiophene separated in (c).

14. The method according to claim 12, wherein said organic liquid comprises at least one alkane or cycloalkane having at least about 6 carbon atoms.

15. The method according to claim 14, wherein said organic liquid comprises at least one hydrocarbon selected from the group consisting of n-heptane, 2-methylhexane, 3-methylhexane, cycloheptane and methylcyclohexane.

16. The method according to claim 12, wherein the portion of the polythiophene that is dissolved is from about 1 wt. % to about 15 wt. %.

17. A method of modifying mobility of a polythiophene, the method comprising:
(a) providing a composition comprising polythiophene and a liquid comprising at least one hydrocarbon selected from the group consisting of n-heptane, 2-methylhexane, 3-methylhexane, cycloheptane and methylcyclohexane;
(b) heating the composition to a temperature of from about 70° C. to about 95° C.;
(c) filtering the composition at a temperature of from about 70° C. to about 95° C. to separate solid polythiophene from the filtrate; and
(d) optionally repeating (a) to (c) one or more times using the solid polythiophene separated in (c);
wherein the molecular weight distribution of said polythiophene is narrowed.

* * * * *